US012385293B2

(12) United States Patent
Dragon et al.

(10) Patent No.: US 12,385,293 B2
(45) Date of Patent: Aug. 12, 2025

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventors: Marek Dragon, Waldbröl (DE); Andrej Grzonka, Witten (DE); Dennis Grzonka, Herne (DE); Alexander Grossmann, Essen (DE)

(73) Assignee: Kiekert AG, Heiligenhaus (DE)

( * ) Notice: Subject to any disclaimer, the term of this patent is extended or adjusted under 35 U.S.C. 154(b) by 310 days.

(21) Appl. No.: 17/996,092

(22) PCT Filed: Mar. 22, 2021

(86) PCT No.: PCT/DE2021/100282

§ 371 (c)(1),
(2) Date: Oct. 13, 2022

(87) PCT Pub. No.: WO2021/209088

PCT Pub. Date: Oct. 21, 2021

(65) Prior Publication Data

US 2023/0243193 A1 Aug. 3, 2023

(30) Foreign Application Priority Data

Apr. 16, 2020 (DE) ..................... 10 2020 110 454.4

(51) Int. Cl.

*E05B 77/28* (2014.01)
*E05B 15/00* (2006.01)
(Continued)

(52) U.S. Cl.

CPC .......... *E05B 77/28* (2013.01); *E05B 15/0053* (2013.01); *E05B 77/26* (2013.01);
(Continued)

(58) Field of Classification Search

CPC ........ E05B 77/24; E05B 77/245; E05B 77/26; E05B 77/265; E05B 77/28; E05B 77/283; E05B 81/16
See application file for complete search history.

(56) References Cited

U.S. PATENT DOCUMENTS

| | | | | |
|---|---|---|---|---|
| 4,934,746 A * | 6/1990 | Yamada | E05B 81/16 | 292/201 |
| 5,702,136 A * | 12/1997 | Funk | E05B 77/265 | 292/216 |
| 6,148,651 A * | 11/2000 | Roncin | E05B 77/265 | 292/201 |
| 7,568,740 B2 * | 8/2009 | Brose | E05B 81/16 | 292/201 |

(Continued)

FOREIGN PATENT DOCUMENTS

| | | |
|---|---|---|
| DE | 10157473 A1 | 5/2002 |
| DE | 102004017014 A1 | 10/2005 |

(Continued)

OTHER PUBLICATIONS

International Search Report mailed Jul. 9, 2021, for priority International Patent Application No. PCT/DE2021/100282.

*Primary Examiner* — Alyson M Merlino
(74) *Attorney, Agent, or Firm* — Renner, Otto, Boisselle & Sklar, LLP

(57) ABSTRACT

A motor vehicle lock, in particular a motor vehicle door lock, comprising a locking mechanism consisting essentially of a rotary latch and a pawl, further comprising an actuation lever chain for the locking mechanism, and comprising a locking element, at least one securing element, and exactly one spring element that cooperates with both the locking element and the securing element. The actuation lever chain can be controlled via the locking element to be put at least into the functional states "unlocked" and "locked" and can be additionally controlled via the securing element to be put into the functional states "non-secured" and "secured."
(Continued)

According to the invention, the spring element additionally cooperates with the actuation lever chain.

11 Claims, 5 Drawing Sheets

(51) Int. Cl.

| | |
|---|---|
| ***E05B 15/04*** | (2006.01) |
| ***E05B 77/26*** | (2014.01) |
| ***E05B 81/06*** | (2014.01) |
| ***E05B 81/16*** | (2014.01) |

(52) U.S. Cl.

CPC .............. *E05B 81/06* (2013.01); *E05B 81/16* (2013.01); *E05B 2015/0486* (2013.01); *E05B 2015/0496* (2013.01)

(56) References Cited

U.S. PATENT DOCUMENTS

| | | | | |
|---|---|---|---|---|
| 8,454,061 | B2 * | 6/2013 | Spurr ...................... | E05B 81/16 292/201 |
| 10,526,818 | B2 * | 1/2020 | Rosales .................... | E05B 77/12 |
| 2017/0191289 | A1 * | 7/2017 | Perkins .................... | E05B 77/06 |

FOREIGN PATENT DOCUMENTS

| | | | | |
|---|---|---|---|---|
| DE | 102008018500 | A1 | 4/2009 | |
| DE | 102013000854 | A1 | 7/2014 | |
| DE | 102014106065 | A1 | 10/2014 | |
| DE | 102017124530 | A1 | 4/2019 | |
| DE | 102019107572 | A1 * | 10/2020 | |
| EP | 1518984 | A1 * | 3/2005 | ............. E05B 81/06 |

* cited by examiner

MOTOR VEHICLE LOCK, IN PARTICULAR MOTOR VEHICLE DOOR LOCK

This application is a national phase of International Patent Application No. PCT/DE2021/100282 filed Mar. 22, 2021, which claims priority to German Patent Application No. 10 2020 110 454.5 filed Apr. 16, 2020, each of which is hereby incorporated herein by reference in its entirety.

FIELD OF DISCLOSURE

The invention relates to a motor vehicle lock, in particular a motor vehicle door lock, comprising a locking mechanism consisting essentially of a rotary latch and a pawl, further comprising an actuation lever chain for the locking mechanism, and comprising a locking element, at least one securing element, and exactly one spring element that cooperates with both the locking element and the securing element, wherein the actuation lever chain can be controlled via the locking element to be put at least into the functional states "unlocked" and "locked" and can be additionally controlled via the securing element to be put into the functional states "non-secured" and "secured."

BACKGROUND OF DISCLOSURE

In the case of motor vehicle locks and in particular motor vehicle door locks, it is generally important that the individual functional states are assumed in a reliable and reproducible manner. This not only has to be ensured over the entire life cycle of the motor vehicle lock, but also and in particular at high and low temperatures. In addition, efforts are generally made to keep the design effort and thus the costs as low as possible.

In the context of the present invention, the term "motor vehicle lock" comprises not only motor vehicle door locks and in particular motor vehicle side door locks. But this also generally comprises motor vehicle locks for front hoods, tailgates, sliding doors, fuel filler caps, charging flaps, etc. The locking element can in principle be a central locking element. With its help, the actuation lever chain can be transferred to the "unlocked" and "locked" functional states.

The functional state "unlocked" usually corresponds to the fact that the locking mechanism can be opened via the actuation lever chain. In contrast, the "locked" functional state is assigned to the situation in which it is generally not possible to open the locking mechanism via the actuation lever chain from the outside, but it is still permitted from the inside.

The securing element additionally provided can generally be a child-protection securing element or an anti-theft securing element or both. In the case of a child-protection securing element, which is typically only implemented on rear motor vehicle side doors, the functional state "non-secured" is assigned to the situation that the (rear) motor vehicle side door in question can be opened from the inside, even if, for example the locking element is in the "locked" state. In contrast, the "secured" state corresponds to the fact that the motor vehicle door in question cannot be opened from the inside.

If the securing element is an anti-theft securing element, the functional state "non-secured" corresponds to the fact that the associated motor vehicle door can generally be opened both from the inside and from the outside. In contrast, the "secured" functional state means that the motor vehicle door can neither be opened from the inside nor from the outside, so that the associated motor vehicle lock cannot be opened even if the window of the motor vehicle door is smashed, for example.

Both the locking element and the securing element can be engaged by motor or drive technology as well as manually or by hand. For example, a child-protection securing nut is known in connection with a child-protection securing element, with the help of which the various functional states can be set manually. In contrast, the functional state of the locking element or central locking element is usually changed by motor or drive technology.

Due to temperature-related effects and/or as a result of long-term use, it is possible that the individual functional states described cannot, or cannot reliably, be set or maintained. For this reason, in practice, toggle springs, with the help of which the two general functional states are usually set or maintained in a bistable manner, are often assigned to the respective element. Such an embodiment is structurally complex because each element is assigned its own toggle spring.

For this reason, there are already approaches in the state of the art to the effect that a spring can take on a variety of functions. For example, the applicant's DE 10 2017 124 530 A1 describes a motor vehicle door lock that is equipped with a first and second pawl. The first pawl is acted upon by a spring via an actuation lever. For this purpose, the spring has two spring legs extending from a leg base, one spring leg resting on the actuation lever in question, while the other spring leg rests on the further second pawl. Due to the specific design, the teaching described above has not significantly affected the present problems of reliably assuming and maintaining the functional states of both the locking element and the securing element.

The further state of the art according to DE 101 57 473 A1 concerns a drive unit for a door lock, in which an engagement part in the form of a spring is provided on a toothed wheel or a cam. The engagement part or the leaf spring implemented at this point can be brought into engagement with an unlocking mechanism when a locking mechanism is in the initial state. The leaf spring in question therefore assumes a force-transmitting function and is not used to change or secure position.

For example, this is the procedure for the generic state of the art according to DE 10 2008 018 500 A1. In this case, too, a motor vehicle lock is implemented, with the associated lock mechanism being able to be brought into different functional states such as "unlocked", "locked", "theft-proof," or "child-proof". These functional positions are assumed with the help of a resiliently flexible wire or strip. For this purpose, the bending functional element in question is transferred into different functional positions. For this reason, the bending functional element in question ultimately provides a switchable coupling between two pivotable adjusting elements of the motor vehicle lock.

SUMMARY OF DISCLOSURE

The state of the art has basically proven itself when it comes to realizing different functions using exactly one spring element. Up to now, however, the spring element in question has mainly been used as a coupling for mechanical connection. As a result, temperature-related effects ultimately cannot be controlled. The invention as a whole seeks to remedy this.

The invention is based on the technical problem of further developing such a motor vehicle lock and in particular a motor vehicle door lock in such a way that the various functional states of the actuation lever chain can be assumed reliably and over the entire temperature range that can be covered, taking into account a structurally simple design.

To solve this technical problem, a generic motor vehicle lock and in particular a motor vehicle door lock is characterized within the scope of the invention in that the (precisely one) spring element cooperates not only with the locking element and the securing element but also with the actuation lever chain.

According to the invention, the spring element thus assumes a triple function. Thus, the spring element not only cooperates with the locking element and the securing element. Rather, according to the invention, a third cooperation occurs with the actuation lever chain. The spring element, in connection with the locking element and the securing element, generally ensures that the relevant element (securing element and spring element) is secured in position at this point and can be provided. In contrast, the additional cooperation of the (single) spring element with the actuation lever chain is designed in such a way that with the help of the spring element, for example, an actuation lever as a part of the actuation lever chain is reset after it has been deflected.

This means that, within the scope of the invention, a (single) spring element ensures on the one hand that the position of both the securing element and the locking element is secured. On the other hand, the spring element additionally ensures that the actuation lever in question or the actuation lever chain as a whole is moved back into its starting position after it has been deflected, for example, in order to act upon the locking mechanism. In this case, the spring element takes on a resetting function, whereas the cooperation with the respective element (securing element or locking element) takes place in the sense of securing the position. Herein lie the substantial advantages.

According to an advantageous embodiment, the spring element is connected to an actuation lever of the actuation lever chain. For this purpose, the spring element is usually designed as a leg spring. For this purpose, the leg spring has a leg base to which two spring legs are connected. If the spring element is coupled to the actuation lever of the actuation lever chain, the leg base ensures that the spring element is connected to the actuation lever with its help. For this purpose, the leg base usually surrounds a bearing portion of the actuation lever.

Here, the invention is based on the finding that the actuation lever is usually mounted rotatably about a bearing pin in a lock case or a lock housing. According to an advantageous embodiment, the bearing pin in question is surrounded by the leg base of the spring element, so that in this way the bearing pin also ensures the fixation of the spring element.

As already explained above, the leg spring has not only the leg base connected to the actuation lever, but also the two spring legs extending from the leg base. The design is advantageously such that the spring element bears with its one lever spring leg against a stop of the actuation lever. An actuation of the actuation lever in the sense of a pivoting movement about its bearing pin consequently results in the lever spring leg in question being deflected. After the actuation lever has been acted upon, the deflected lever spring leg can consequently ensure that the actuation lever is pivoted back into its starting position. This means that the lever spring leg assumes the previously mentioned resetting function of the spring element.

The spring element or its other element spring leg is now advantageously designed according to the invention such that said element spring leg cooperates and can cooperate with both the locking element and the securing element. This means that the element spring leg is used in this context to secure the respective position of the associated and respective element, i.e., both the locking element and the securing element.

For this purpose, the element spring leg is usually equipped with two lugs as part of the spring element. The design is also such that the respective lug cooperates with an associated cam on the relevant element to secure the position. According to an advantageous embodiment, this is done in such a way that the respective functional state of the element is assigned to a position of the associated cam on this side and on the other side of the corresponding lug. This means that the functional state "locked" of the locking element may correspond, for example, to a position of the cam on the locking element on this side of the associated lug of the element spring leg. Consequently, the complementary functional state "unlocked" of the locking element is assigned to the position of the cam on the other side of the associated lug. A change between the two functional states is easily possible in that the cam on the relevant element pushes the lug back against the force of the element spring leg and is transferred from its position on this side of the lug to the position on the other side of the lug and vice versa. This means that two bistable functional states of the respective element are secured with the help of the element spring leg.

This securing can be done in addition to securing, for example, a drive for the element in question, which may be equipped with a self-locking mechanism for this purpose. However, if there is no such self-locking mechanism or if the element in question is acted upon manually, for example, the associated functional state is provided and ensured with the help of the element spring leg or by the combined effect of the associated lug on the element spring leg with the corresponding cam on the element.

Finally, the respective element can be equipped with a toothed segment. The element in question can couple to an associated drive via the toothed segment. For example, if the locking element has a toothed segment, an associated worm gear of a drive motor for the locking element engages this toothed segment. In the same way, the securing element can be equipped with a toothed segment to be driven via an associated motor for the securing element.

Alternatively or additionally, the respective element can also be equipped with an actuating arm. The respective element can be acted upon manually via this actuating arm. However, it is also possible for the actuating arm to be acted upon by means of a drive in order to ultimately implement a respective rotational actuation of the associated element when changing between its two functional states.

As a result, a motor vehicle lock and in particular a motor vehicle door lock is provided which first of all ensures that the two functional states of both the locking element and the securing element are assumed properly, permanently, and reliably even at different and in particular low temperatures.

In addition to this functional reliability, which is increased compared to the state of the art, a particularly simple construction is observed. This can be attributed to the fact that the motor vehicle lock according to the invention works with a (single) spring element, which serves both to secure the position of the locking element and the securing element. As a further third functionality, the spring element in question then also functions as a return spring for the actuation lever chain or an actuation lever as part of the actuation lever chain. This not only provides a structurally simple solution.

Rather, using a (single) spring element at this point also ensures a particularly inexpensive implementation. Herein lie the substantial advantages.

BRIEF DESCRIPTION OF DRAWINGS

The invention is explained in greater detail below with reference to drawings which show only one exemplary embodiment. In the drawings.

DETAILED DESCRIPTION

Figure 1A:
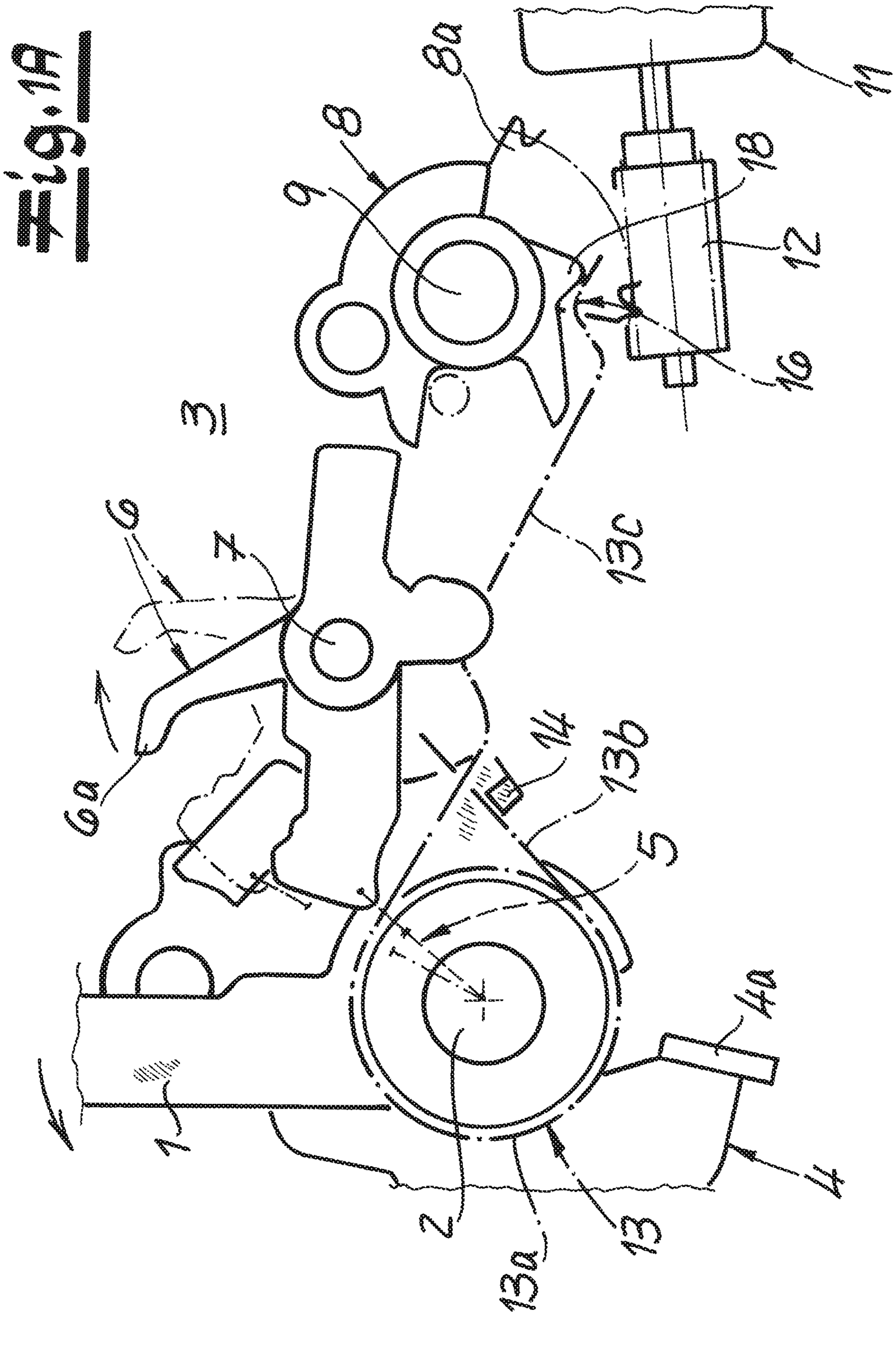
FIG. 1A, 1B, to 4 show the motor vehicle lock or motor vehicle door lock according to the invention in the functional positions "unlocked", "locked", "non-secured," and finally "secured."

In the figures, a motor vehicle lock and in particular a motor vehicle door lock is shown. This has, in its basic structure, a locking mechanism (not shown in detail) consisting of a rotary latch and a pawl and an actuation lever chain 1, 4. According to the exemplary embodiment and for reasons of clarity, the actuation lever chain 1, 4 is reduced to an external actuation lever 1 and a release lever 4 to be described in more detail below. The external actuation lever 1 is mounted in a lock housing 3 such that it can rotate about an axis 2.

The release lever 4 is also rotatably mounted in the lock housing 3 in question about the same axis 2.

The external actuation lever 1 and the release lever 4 can be connected to one another in a quasi-rigid manner via an only partially recognizable coupling lever 5 in its "engaged" state. This corresponds to the "unlocked" state of a locking element 6 which in turn is also mounted in the lock housing 3 such that it can rotate about an axis 7.

Figure 1B:
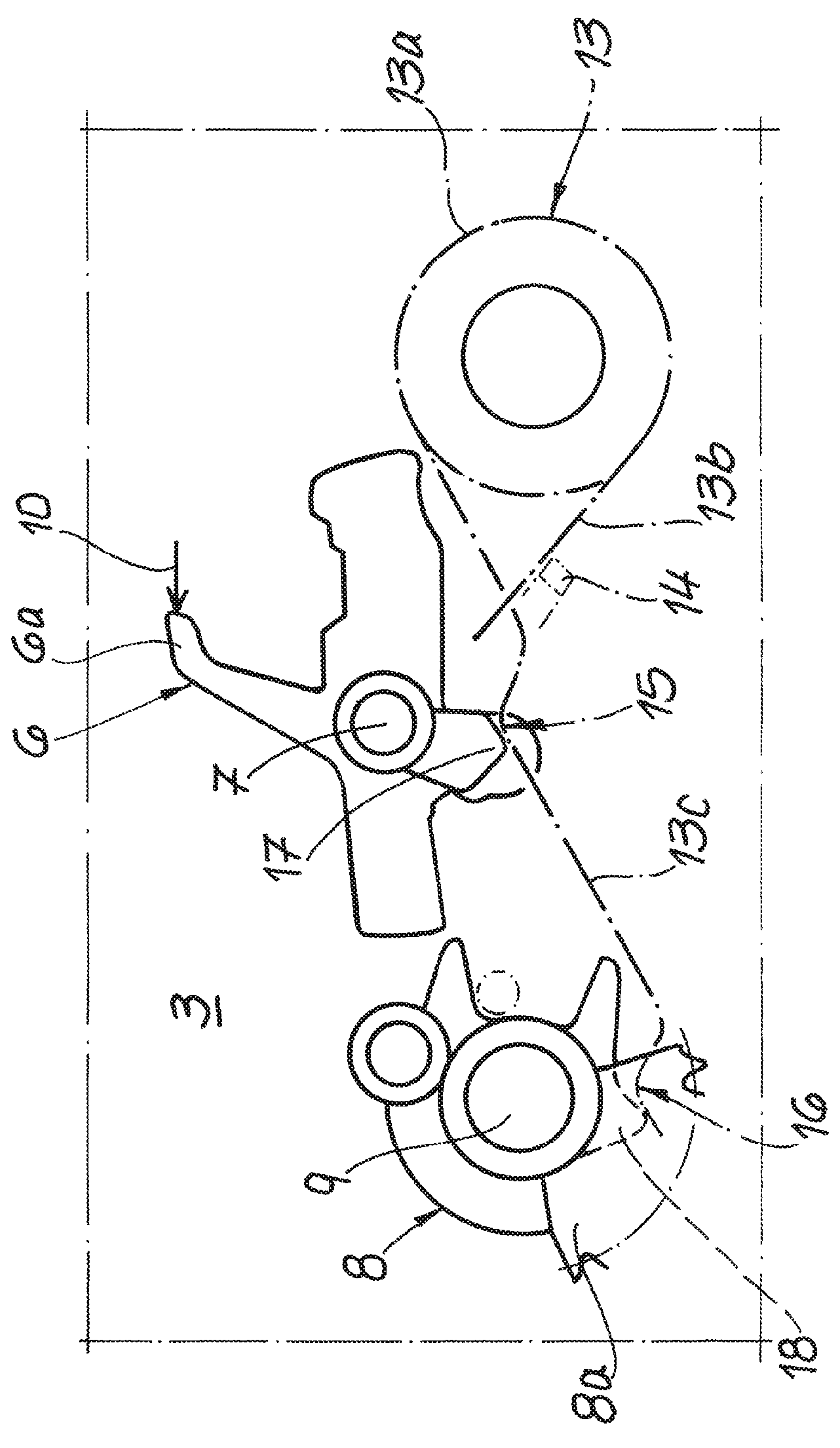
Figure 2:
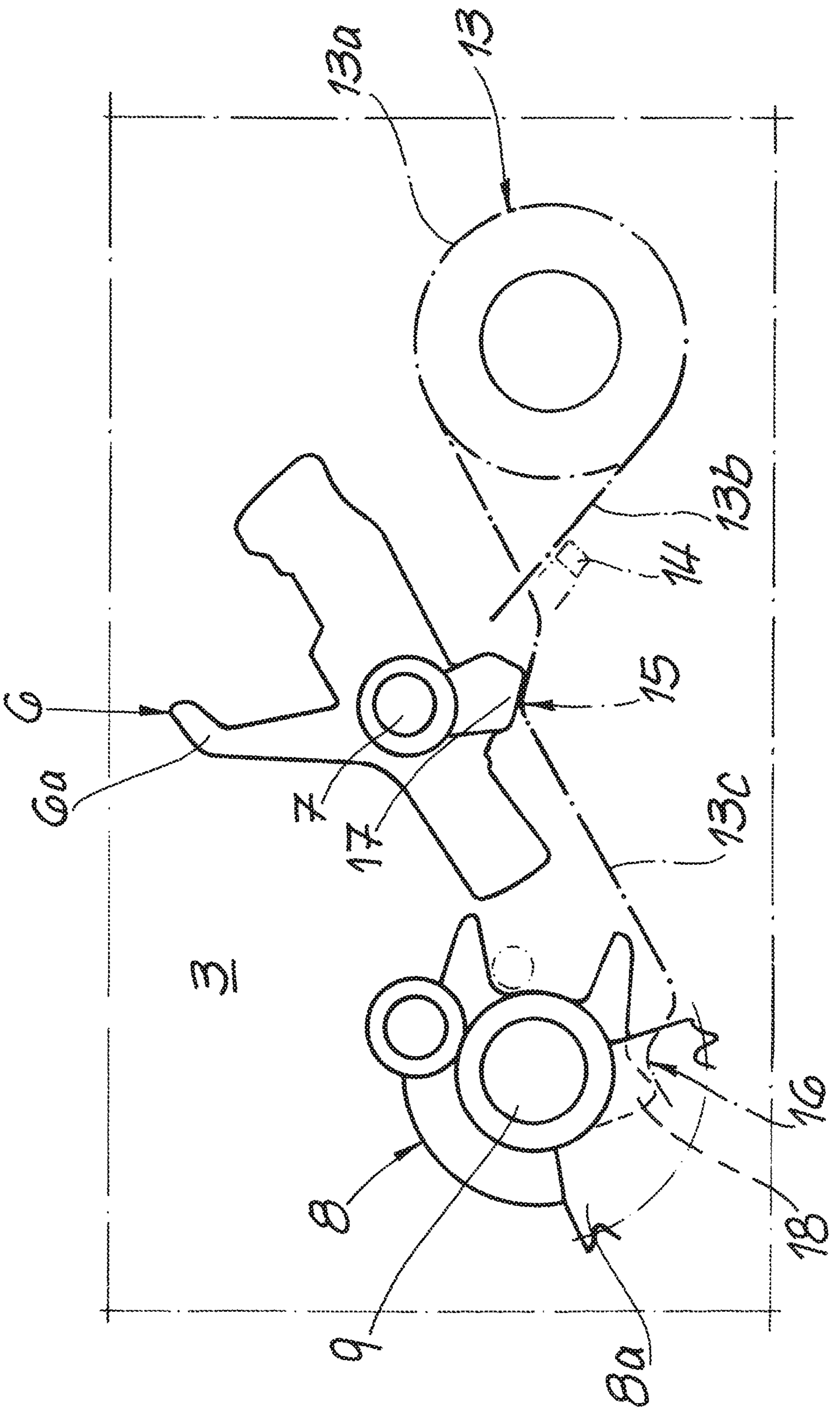

The locking element 6 serves to transfer the coupling lever 5 into its "engaged" and "disengaged" position. The first-mentioned state corresponds to the functional position "unlocked" (FIG. 1A) of the locking element 6, whereas the second-mentioned state "disengaged" of the coupling lever 5 corresponds to the functional position "locked" (FIG. 2) of the locking element 6. In fact, the coupling lever 5 is shown only in the front view of FIG. 1A. The rear view of FIG. 1B and the other FIGS. 2 to 4 correspond to this. In FIG. 1A and 1B, the "unlocked" state is shown as a solid line and is assigned to the "engaged" position of the coupling lever 5. The "locked" state, which is assigned to the "disengaged" state of the coupling lever 5, is shown in dash-dotted lines.

If the locking element 6 is in its "unlocked" functional state, the external actuation lever 1 and the release lever 4 are coupled to one another in a quasi-rigid manner via the coupling lever 5, so that an application of force to the external actuation lever 1 in the counterclockwise direction indicated results in the release lever 4 following the external actuation lever 1 counterclockwise about the common axis 2 in its movement. As a result, a stop 4*a* on the release lever 4 can move against the pawl (not shown in detail) which is thereby lifted from its engagement with the rotary latch, so that a locking pin previously caught by the locking mechanism is released. The associated motor vehicle door can be opened (cf. FIG. 1A).

In addition to the locking element 6, a securing element 8 is also shown in the figures, which is an anti-theft securing element 8 or a child-protection securing element within the scope of the exemplary embodiment and not restrictively.

The securing element 8 is mounted in relation to the lock housing 3 such that it can be pivoted about an axis 9 comparable to the locking element 6.

The locking element 6 has an actuating arm 6*a* on which a drive 10 (only indicated) can act and ensures that the locking element 6 is pivoted about the axis 7 when changing its respective functional state. In principle, the locking element 6 can also be pivoted manually about the axis 7, but this is not shown (cf. FIG. 1B).

The securing element 8 also has an associated drive 11. For this purpose, the securing element 8 in the exemplary embodiment is equipped with a toothed segment 8*a*, in which a worm gear 12 driven by the drive 11 engages. As a result, the securing element or anti-theft securing element 8 can pivot about its axis 9 in order to be able to assume the different functional states "secured" and "non-secured" (cf. FIG. 1A).

The actuation lever chain 1, 4 can now be controlled via the locking element 6 in the already described functional states "unlocked" and "locked" and additionally via the securing element 8 in the functional states "non-secured" and "secured." In addition and according to the invention, both the locking element 6 and the securing element 8 are assigned a spring element 13 that cooperates therewith. In the context of the exemplary embodiment, the design is such that the spring element 13 in question serves to secure the position of both the locking element 6 and the securing element 8 and, according to the invention, also cooperates with the actuation lever chain 1, 4, i.e., takes on a triple function.

For this purpose, the spring element 13 is connected to the actuation lever or external actuation lever 1 of the actuation lever chain 1, 4. It can be seen that the spring element 13, as a leg spring, is equipped with a leg base 13*a* and two spring legs 13*b* and 13*c*. The two spring legs 13*b* and 13*c* are mostly connected tangentially to the leg base 13*a*.

The leg base 13*a* is in turn connected or coupled to the actuation lever or external actuation lever 1. For this purpose, the design within the scope of the exemplary embodiment is such that the leg base 13*a* surrounds a bearing portion of the actuation lever 1 in question, this bearing portion in turn accommodating a bearing pin for mounting the actuation lever 1 (not expressly shown) in its interior.

The spring element 13 rests with its one lever spring leg 13*b* on a stop 14 of the actuation lever 1. As a result, the lever spring leg 13*b* of the spring element 13 in question is tensioned during the indicated opening movement of the actuation lever or external actuation lever 1 in the counterclockwise direction. After the actuation of the actuation lever 1 has ended, the tensioned lever spring leg 13*b* consequently ensures that the actuation lever 1 is returned to the starting position with its help (cf. FIG. 1A).

In addition, the spring element 13 rests with its other element spring leg 13*c* on both the locking element 6 and the securing element 8, or in this way can cooperate with both elements 6, 8 with its element spring leg 13*c*. That is, the element spring leg 13*c* serves to secure the respective position of the associated respective element 6, 8, i.e., both the locking element 6 and the securing element 8.

For this purpose, the element spring leg 13 is equipped with two lugs 15, 16. The two lugs 15, 16 cooperate with respectively associated cams 17, 18. The cam 17 is arranged on the locking element 6, whereas the other cam 18 is on the securing element 8. The cooperation between the two lugs 15, 16 and the associated cams 17, 18 ensures that the relevant element 6, 8, i.e., the locking element 6 or the securing element 8, is secured in position.

In fact, the respective functional state of the element 6, 8 corresponds, on the one hand, to a position of the associated cam 17, 18 on this side and, on the other hand, to a position of the associated lug 15, 16 on the other side. This can be seen in the figures. As a result, the associated functional element 6, 8 can assume bistable functional states in the sense of "unlocked" and "locked" for the locking element 6 on the one hand and "non-secured" and "secured" on the part of the securing element 8 on the other.

Figure 3:
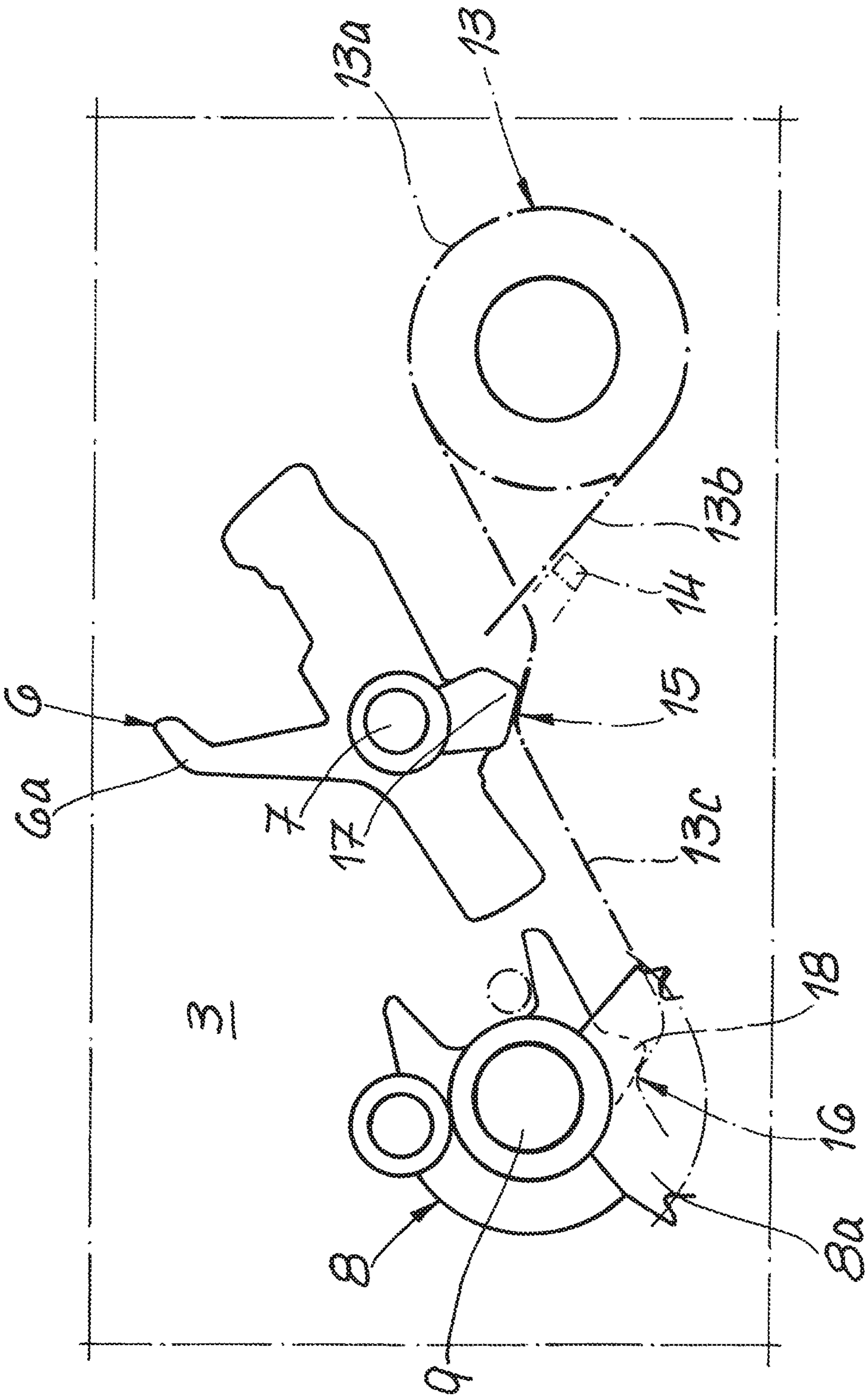
Figure 4:
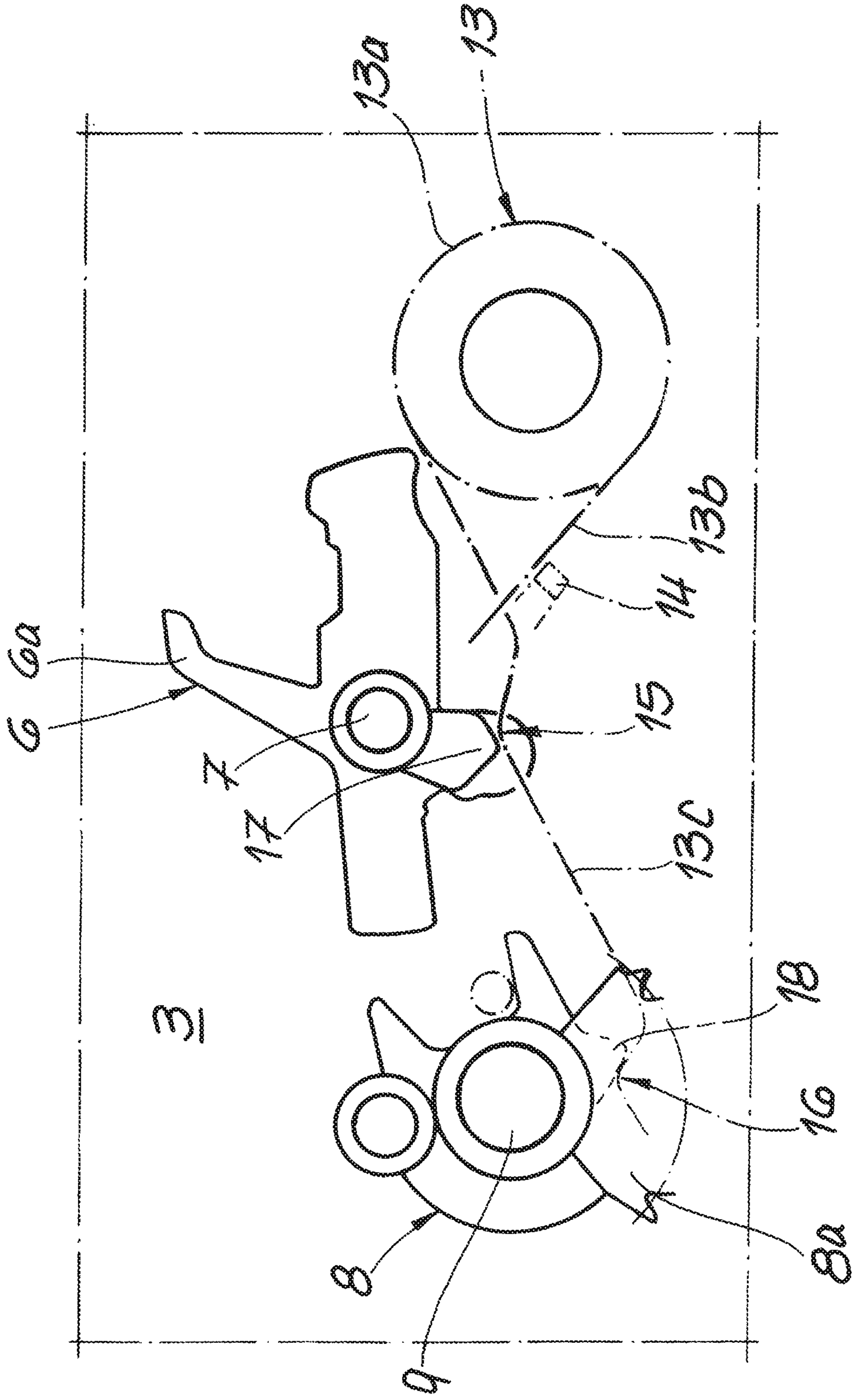

The two elements 6, 8 can in each case assume the previously mentioned functional states independently of one another and reproduce these functional states. This is ensured by the respectively associated and differently controllable respective drives; on the one hand the drive 10 for the locking element 6 and on the other hand the further drive 11 for the securing element 8. As a result, the functional states shown in the individual figures can basically be realized and implemented in a combined manner in terms of "unlocked" and "non-secured" (FIG. 1A, 1B) and "secured" (FIG. 4) and also "locked" in conjunction again with "non-secured" (FIG. 2) and "secured" (FIG. 3).

LIST OF REFERENCE SIGNS

1, 4 Actuation lever chain
1 Actuation lever
4 Release lever
2, 7, 9 Axis
3 Lock housing
5 Coupling lever
6 Locking element
6*a* Actuating arm
8 Securing element
8*a* Toothed segment
10, 11 Drive
12 Worm gear
13 Spring element
13*a* Leg base
13*b* Spring leg
13*c* Spring leg
14 Stop
15, 16 Lugs
17, 18 Cam

The invention claimed is:

1. A motor vehicle lock comprising:

a locking mechanism having a rotary latch and a pawl, an actuation lever chain for the locking mechanism, and a locking element, a securing element, and exactly one spring element, wherein the spring element includes a first spring leg that engages the actuation lever chain and a second spring leg that engages the locking element and the securing element wherein the actuation lever chain is controlled via the locking element to be put at least into one of a functional unlocked state and a functional locked state and additionally is controlled via the securing element when the securing element is put into one of a functional non-secured state and a functional secured state;

wherein the second spring leg engages the locking element and the securing element so as to secure a respective position of both the locking element and the securing element; and wherein the second spring leg is equipped with two lugs, and each of the two lugs cooperates with an associated cam on each of the locking element and the securing element to secure the respective positions of the locking element and the securing element.

2. The motor vehicle lock according to claim 1, wherein the first spring leg of the spring element is engaged with the actuation lever chain through a connection of the first spring leg to an actuation lever of the actuation lever chain.

3. The motor vehicle lock according to claim 1, wherein the spring element further includes a leg base to which the first and second spring legs are connected, and the leg base is connected to an actuation lever of the actuation lever chain.

4. The motor vehicle lock according to claim 3, wherein the leg base surrounds a bearing portion of the actuation lever.

5. The motor vehicle lock according to claim 2, wherein the first spring leg that bears against a stop of the actuation lever so as to provide the connection between the first spring leg of the spring element and the actuation lever.

6. The motor vehicle lock according to claim 1, wherein a respective one of the functional states of the actuation lever chain and the securing element corresponds to a position of the associated cam on each of the locking element or the securing element on either side of a respective one of the two lugs.

7. The motor vehicle lock according to claim 1, wherein the locking element is equipped with an actuating arm and the securing element is equipped with a toothed segment for a rotational actuation.

8. The motor vehicle lock according to claim 1, wherein the functional locked state of the actuation lever chain corresponds to a position of the associated cam on the locking element on a first side of an associated one of the two lugs, and the functional unlocked state of the actuation lever chain corresponds to a position of the associated cam on the locking element on another side of the associated one of the two lugs.

9. The motor vehicle lock according to claim 7, further comprising a drive having a drive motor and a worm gear that engages with the toothed segment.

10. The motor vehicle lock according to claim 7, wherein the actuating arm is manually actuatable.

11. The motor vehicle lock according to claim 1, wherein the actuation lever chain includes an external actuation lever and a release lever mounted about a common axis.

* * * * *